United States Patent [19]

Shafer

[11] Patent Number: 4,737,975
[45] Date of Patent: Apr. 12, 1988

[54] PROGRAMMABLE SYSTEM FOR INTERFACING A STANDARD TELEPHONE SET WITH A RADIO TRANSCEIVER

[75] Inventor: James E. Shafer, Jackson, Miss.
[73] Assignee: Metrofone, Inc., Skokie, Ill.
[21] Appl. No.: 947,630
[22] Filed: Dec. 30, 1986

Related U.S. Application Data

[63] Continuation-in-part of Ser. No. 651,817, Sep. 18, 1984, Pat. No. 4,658,096.

[51] Int. Cl.⁴ .............................................. H01Q 7/04
[52] U.S. Cl. ........................................ 379/58; 379/63
[58] Field of Search .................. 379/58, 63, 56, 57, 379/89, 61; 455/33, 34

[56] References Cited

U.S. PATENT DOCUMENTS

| | | | |
|---|---|---|---|
| 4,012,596 | 3/1977 | West, Jr. et al. | 379/56 |
| 4,553,267 | 11/1985 | Crimmips | 455/606 |
| 4,612,415 | 9/1986 | Zounek et al. | 379/58 |
| 4,635,285 | 1/1987 | Coombes | 379/63 |
| 4,646,345 | 2/1987 | Zounek et al. | 379/62 |
| 4,658,096 | 4/1987 | West, Jr. et al. | 379/59 |
| 4,661,970 | 4/1987 | Akaiwa | 379/61 |
| 4,677,656 | 6/1987 | Burke et al. | 379/63 |
| 4,680,786 | 7/1987 | Baker et al. | 379/60 |
| 4,682,350 | 7/1987 | Akebberg | 379/61 |

OTHER PUBLICATIONS

Motorola Model Q1372A ITMS Subscriber Unit Instructions Manual; Motorola Engineering Publications; 1973.
E. F. Johnson 1154 Cellular Mobile Transceiver Service Manual, Jun. 1985.
Glenayre GL2020 Mobile Telephone Operating Instructions; Glenayre Electronics.

Primary Examiner—Robert Lev
Attorney, Agent, or Firm—Milton S. Gerstein; Marvin N. Benn

[57] ABSTRACT

A programmable interface system for interfacing a standard telephone set with a radio transceiver as part of a telephone network is provided. The radio transceiver may be a conventional cellular-type transceiver or other transceiver having typical control inputs and outputs similar to that provided by cellular transceivers. The programmable interface system converts tone-dial or pulse-dial inputs from the telephone into a serial data stream for storage in the transceiver. The programmable interface system can be programmed to automatically determine when the last numeral or digit is dialed for a particular area telephone system and provides a send signal to the transceiver when such determination is made. The system responds to incoming call signals, such as alert signals, from the transceiver and rings the telephone accordingly. The system simulates ring and dial-tone type signals under conditions typical of standard telephone set usage.

18 Claims, 9 Drawing Sheets

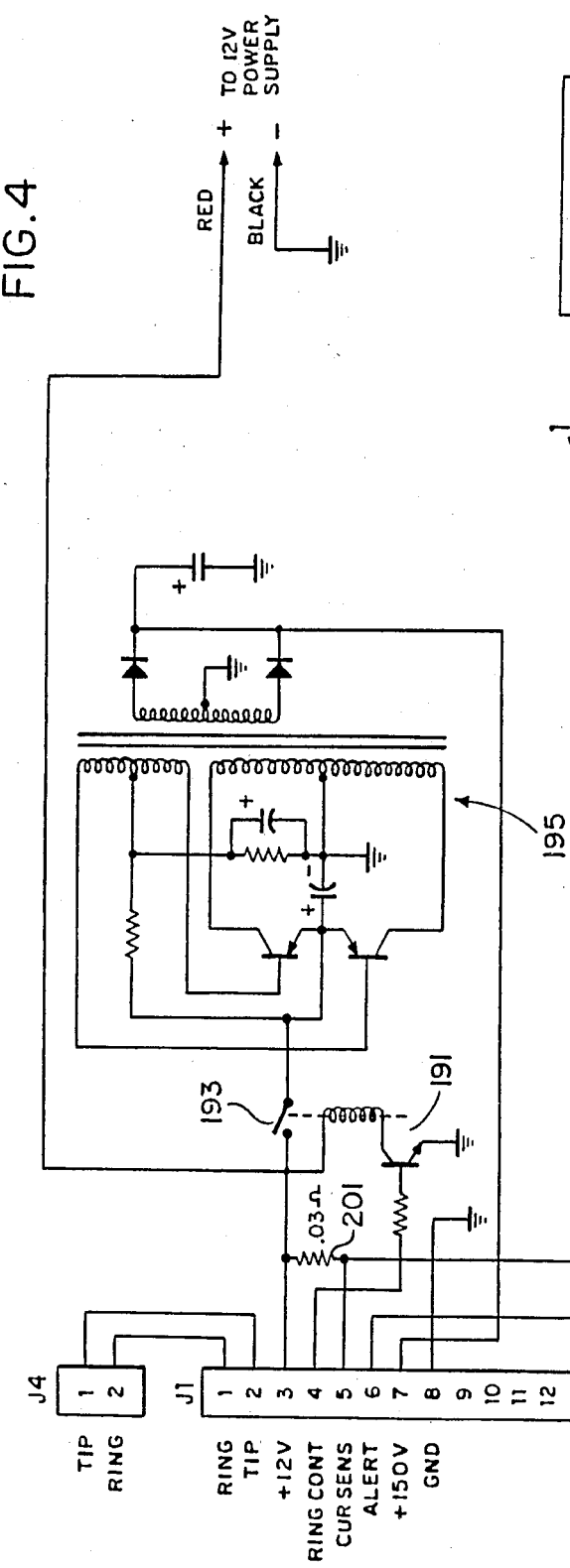
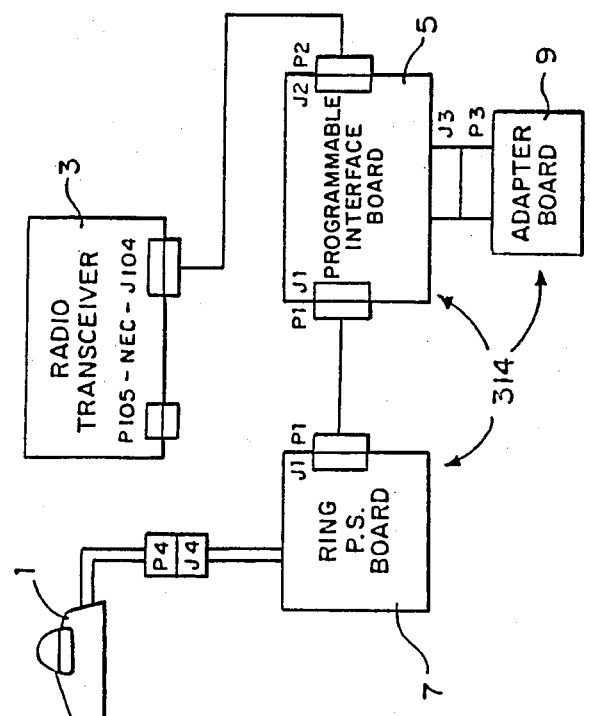
FIG. 4
FIG. 2

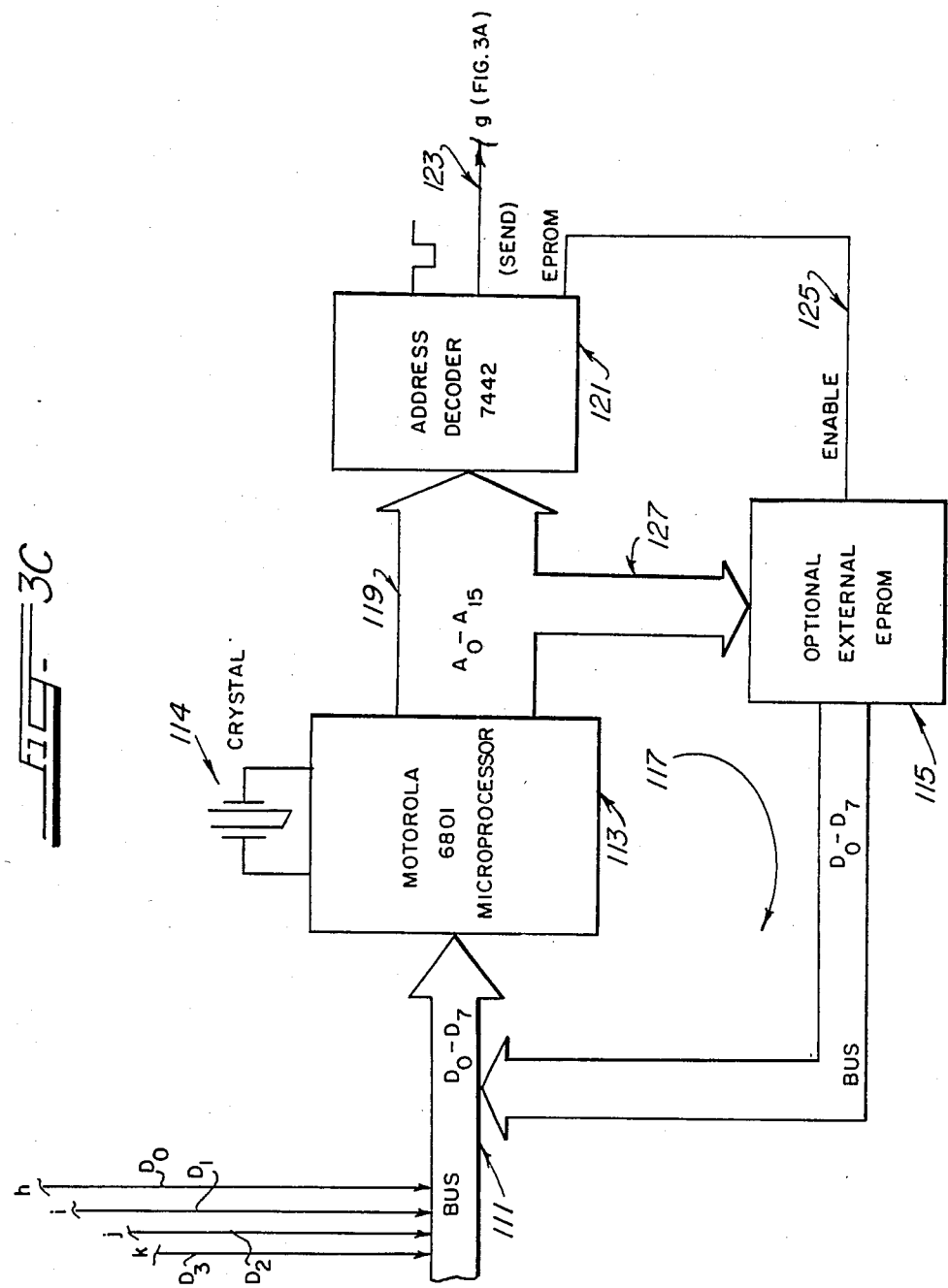

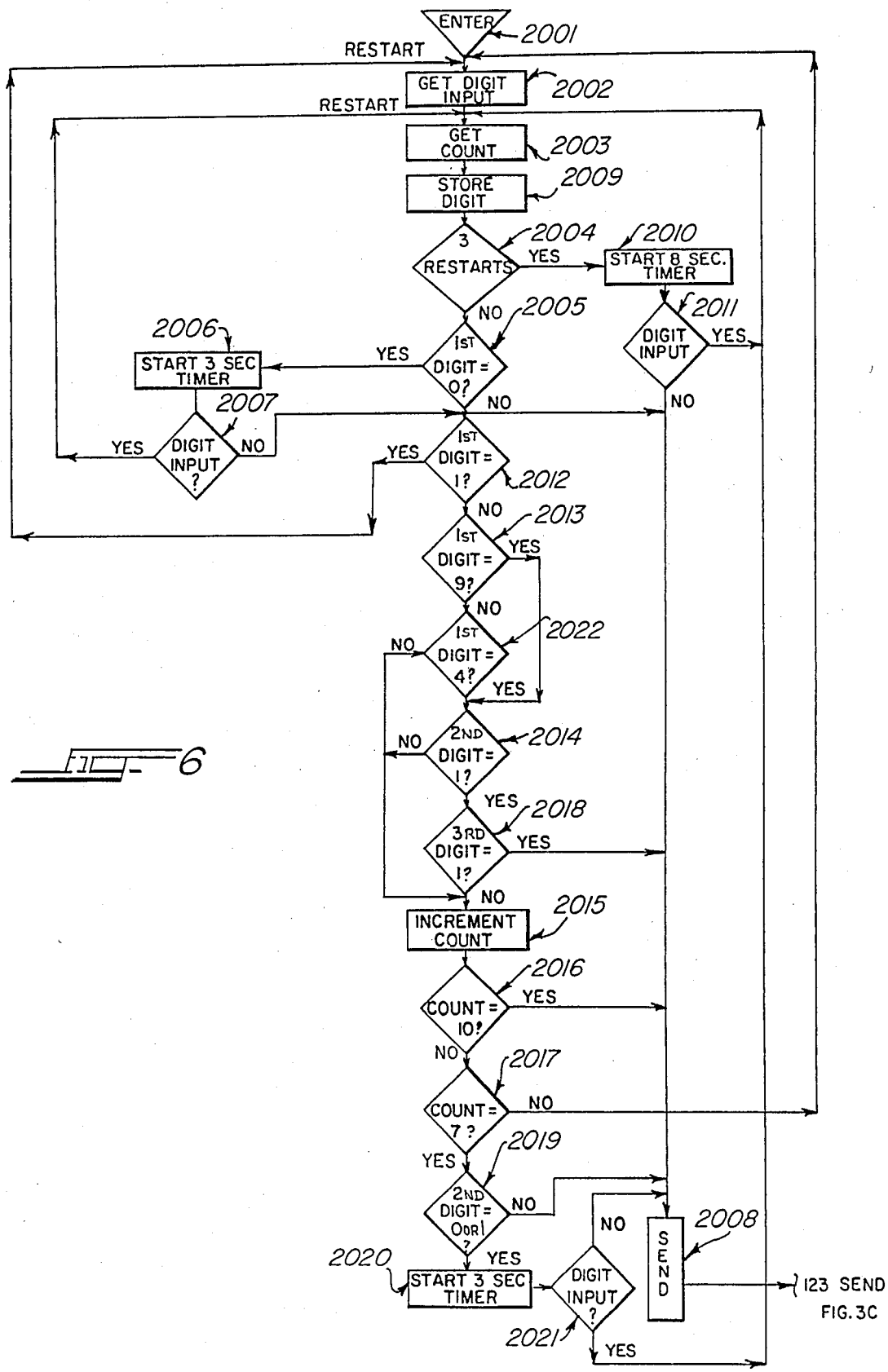

PROGRAMMABLE SYSTEM FOR INTERFACING A STANDARD TELEPHONE SET WITH A RADIO TRANSCEIVER

BACKGROUND OF THE INVENTION

This is a continuation-in-part of the patent application Ser. No. 651,817, filed Sept. 18, 1984 now U.S. Pat. No. 4,658,096, entitled "SYSTEM FOR INTERFACING A STANDARD TELEPHONE SET WITH A RADIO TRANSCEIVER."

The present invention relates to a programmable system for interfacing a standard telephone set with a radio transceiver that is linked, directly or indirectly, to a local central telephone office in an overall telephone network. In particular, the present invention is adapted to interface the telephone set with a conventional cellular mobile radio transceiver that is part of an existing cellular radio system in the area, and allow the interface to be programmed to emulate any of a variety of telephone systems.

Conventional telephone network sytems typically require transmission lines or cables from a local telephone company central office to individual fixed locations, such as a home or an office. The telephone trunk lines entering the fixed location are connected to one or more individual telephone sets, of the touch-tone or pulse-dialing variety, or to a switching unit that may be coupled to a PBX or other type of internal office system network. Conventional telephone network systems suffer from the disadvantage of having to lay costly transmission lines, particularly in areas outside the largest population centers.

Another type of telephone system is the cellular mobile radio telephone system. This system provides for communication between a mobile base station, such as an automobile, and the telephone network. Such cellular radio telephone systems include a plurality of base station transmitter and receiver units carried by the automobile, with computer logic circuitry associated therewith, that provides a radio link with one or more cellular transmitter-receiver stations associated with an 800MC fixed antenna. The cellular receiver-transmitter stations are linked to a computerized central switching center that interfaces with the local telephone network central office. Transmission between the mobile base station transceiver to the cellular station or substation occurs by high speed digital communication.

The base station mobile radio units carried by the automobile typically include a transmitter, a receiver, and computer logic circuitry (hereinafter referred to collectively as the "transceiver") that is mounted in the automobile trunk. The transceiver is connected to a control head that is mounted in the passenger compartment for oepration by the user. Typically, the control head includes a microphone, a speaker, and a touch pad for dialing and sending codes to the transceiver to control the transceiver. For example, when a phone number is to be dialed, the user manually inputs the phone number when is then displayed and simultaneously stored in the transceiver memory. The user visually checks to see if the number to be dialed is correct and, if so, activates a SEND button for providing a send code to the transceiver to inform the transceiver that the number stored in its memory is to be digitally transmitted. The numbers to be dialed are then transmitted in a binary data stream for ultimate receipt by the telphone company central office.

The cellular-type transceiver control head interfaces with the trunk-mounted transceiver in a manner totally different from the way a standard telephone set interfaces with the telephone company telephone network. As such, a standard telephone set cannot be coupled with a conventional cellular radio transceiver since the inputs required to control the transceiver, and the transceiver outputs provided to the control head, are simply not compatible with the typical touch-tone/pulse-dialing telephone set. In addition, as one compares the telephone systems of different countries, each country has its own unique numbering system for emergencies, long distance and operator assistance, and so forth. It can therefore be seen that interface between a cellular system and a wire-line phone in one country will not necessarily interface a cellular system in another country.

SUMMARY OF THE INVENTION

The present invention relates to the programmable interfacing of conventional telephone handsets with standard cellular-type radio transceivers. By the programmable interfacing system of the present invention, the telephone set can be used in its conventional and customary manner in any particular telephone system, to dial out and receive telephone calls. Similarly, standard radio transceivers for a particular telephone system, such as those used in cellular radio systems, can be made compatible with the telephone handset without modification.

By the programmable interfacing system of the present invention, the cellular-type transcevier can be used as a fixed station associated with homes or offices, without requiring any change in the internal home or office network of any particular telephone system. Telephone service can be provided to such home or office locations by wireless transmission, thus obviating the need for costly telephone transmission line installation. Further, the instant invention would make the installation of radio telephone communication, such as conventional cellular radio telephone systems, practical in less populated areas.

By providing a programmable interface, the same interface device can be used in many non-compatible telephone systems. The instant invention can be packaged in a relatively small housing and can be coupled to standard telephones or to an in-house switching network wherein each packaged unit can be associated with what would normally be an incoming telephone trunk line. The unit consists of a standard radio transceiver, such as a cellular mobile radio unit. Only the portion that is typically mounted in the trunk is used. This includes the receiver, transmitter, and computer logic circuitry, omitting the control head portion. The system uses a small 800MC gain antenna which can be mounted on the roof of the building. Preferably a small directional antenna, aimed at the existing remote cellular transmitter-receiver antenna, can be used. The system further includes a power supply, which is designed to produce enough current at 12 volt DC to operate the radio and the typical functions of the telephone handset. A rechargeable high current 12 volt battery can be used in the event of a power failure.

The radio transceiver is coupled with conventional telephone sets by a novel programmable interface system. The interface system includes circuitry for simulating typical telephone ring and dial tone signals. When the telephone handset is taken off hook, an internal tone generator within the interface system is coupled across the ring and tip electrodes to generate tones simulating a dial tone. If the system remains off hook for more than a predetermined period of time without any dialing or communication otherwise occurring, the tone generator is pulsed on and off to simulate a reorder tone. When an incoming call is received, characterized by receipt of an alert signal from the transceiver, the interface system provides a ring signal to the telephone set ring circuit. The telephone set than rings in a conventional manner until the set is taken off hook. When taken off hook, the ring circuit is disabled so that ringing stops and a connection to the transceiver is completed.

The programmable interface system of the present invention includes a means for converting the touch tone or pulse dialed numerals, or digits, to digital data for transmission by the transceiver. As each digit is dialed, the touch tone or pulse dialed signals are converted to digital data for storage in the transceiver. After all the digits are dialed, the interface system through programmable means automatically determines when the last numeral or digit has occurred and provides a SEND coded signal to the transceiver. The transceiver, in response to the SEND code (analogous to a manually pushed button on conventional cellular radio systems), transmits the digital data for ultimate decoding by the local telephone central office to complete the call. When the call is completed, and the handset goes on-hook, an END signal is provided to the transceiver to signify the on-hook condition.

It is thus an object of the prent invention to provide a new and unique programmable interfacing system for interfacing a standard telphone set with a wireless radio transceiver typically of the cellular radio-type. Moreover, it is an object of the present invention to make a standard transceiver of the cellular type fully compatible with conventional telephone sets without modification to the transceiver or to the existing cellular network. Thus, an existing radio communication system, such as a cellular radio telephone system, can be integrated with fixed station conventional dialing units.

In particular, it is an object of the programmable interface system of the present invention to be programmably compatible with most conventional telephone systems around the world and convert the touch-tone or pulse-dial digits to digital data for storage in the transceiver and to automatically determine when the last numeral, or digit, has been dialed to thus provide a send signal to the transceiver for ultimate transmission. Still further, it is an object of the present invention to provide a programmable interface system that provides ring and dial tone frequencies, of the proper duration, to the telephone handset so that the handset can be operated in its conventional well-known manner in any standard telephone systems throughout the world.

Still another object of the present invention is to employ the standard cellular-type radio tranceiver in a fixed location with conventional telephone handsets to provide telehone communication with the fixed location over a variety of existing cellular network, thus avoiding costly wire line transmission systems.

These and other objects of the invention will be apparent when reference is made to the following detailed description and drawings.

BRIEF DESCRIPTION OF THE DRAWINGS

FIG. 2 is an overall block diagram of the programmable interfacing system of the present invention.

FIGS. 3A to 3D are detailed schematics of the programmable interface board portion of a fixed interface system.

FIG. 4 is a schematic of the power supply board of the programmable interface system.

FIG. 6 is the program flow chart for the programmable microprocessor controlled dialing recognition circuit shown in FIG. 3C.

FIG. 7 is an alternate ring-detecting circuit.

DETAILED DESCRIPTION OF INVENTION

Figure 1:
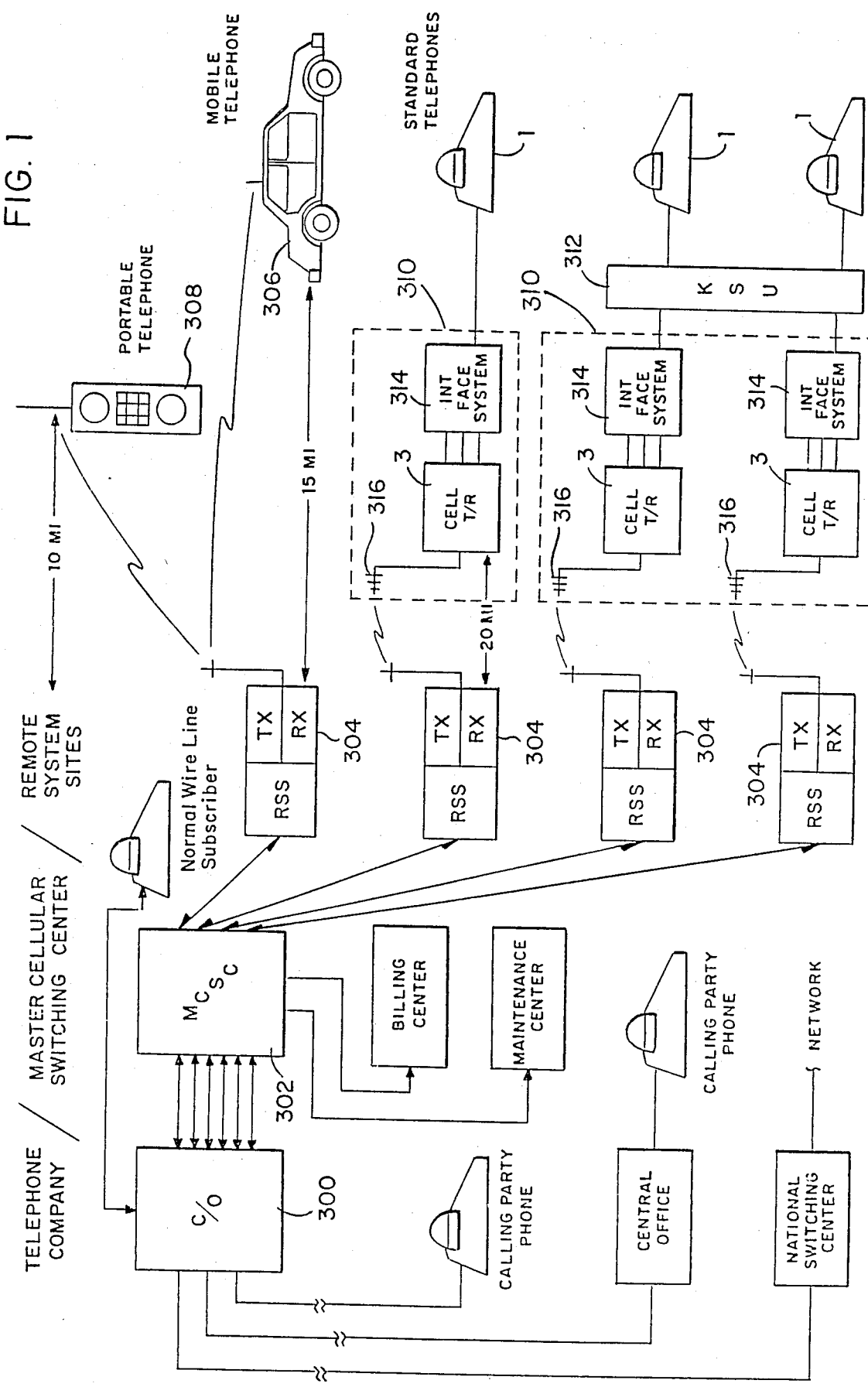
FIG. 1 is an overall block diagram of a typical cellular radio telephone network incorporating the programmable interfacing system of the present invention.

A typical cellular radio telephone network is depicted in FIG. 1. A telephone company central office 300 is coupled with the national switching center network, and various telephones in the local area, including business offices through a business central office. The telephone company central office interfaces with a master cellular switching center 302 which, in turn, interfaces the telephone phone company central office 300 with various cellular transmitter-receiver station remote system sites 304. These remote system sites are characterized by one or more transmitter and receiver units, aloong with a 150 to 300 foot tower upon which an antenna is mounted. These remote system sites 304 are coupled with the master cellular switching center 302.

A base station receiver and transmitter unit is typically located in the trunk of an automobile 306 and generally consists of a transmitter, a receiver and computer circuitry (hereinafter the "transceiver") to provide a wireless transmission path from the base station mobile unit to the remote system site. Hand held portable cellular telephones 308 can also be used to communicate with the remote system site 304 antennas. In addition to the trunk-mounted transceiver, a control head, not shown, consisting of a specially-designed key pad and display panel, is mounted in the passenger compartment and is cabled with the transceiver.

As depicted generally in FIG. 1, the programmable interface system 314 is provided to couple a standard telephone set 1 of the touch-tone or pulse-dialed variety with a transceiver 3 such as any country's standard cellular mobile radio unit transceiver. The transceiver 3 is typically the trunk mounted portion of the normal cellular radio package. This includes the transmitter, the receiver, and associated computer logic circuitry. As seen generally in FIG. 1, the system 310 can be coupled directly to a telephone hand set 1 or to a central switching box 312 typically used in an office environment. In such a system, a separate tranceiver 3 and interface system 314 is associated with what would normally be an incoming trunk line. The transceiver 3 is associated with an antenna 316 which may be a small directional 800MC gain antenna. By using a directional antenna 316, aimed at the nearest remote system site 304, a greater range can be obtained than with the omnidirectional antennas typically used in an automobile-mounted celluar transceiver.

FIG. 2 shows the general layout of the interface system that couples the standard touch-tone/pulse-dialing telephone set 1 with the radio transceiver 3. In the preferred embodiment, the transceiver 3 is a standard cellular radio transceiver such as the NEC TR5E800-2B. The use of such radio transceiver renders the system operable over the standard cellular radio network as described earlier. It should be noted that other radio transceivers of the cellular-type could be used and modifications, depending upon the particular transceiver characteristics, may be required. Further, the present invention has capability to non-cellular communication systems that may also employ a wireless radio link between a base station and master stations that ultimately are interconnected with the central office of a local or national telephone network. For example, an IMTS transceiver may be used. Further, the transceiver may be part of a compander system as is known in the art. In essence, any radio transceiver that is controlled by inputs (such as SEND signals, etc.) similar to those in cellular transceivers, and that provides outputs similar to the outputs currently provided by cellular transceivers (such as alert signals, etc.) may be used. The transceiver 3 is simlar to the system that is currently installed in an automobile, but without the control head which is mounted in the passenger compartment of an automobile.

Figure 3A:
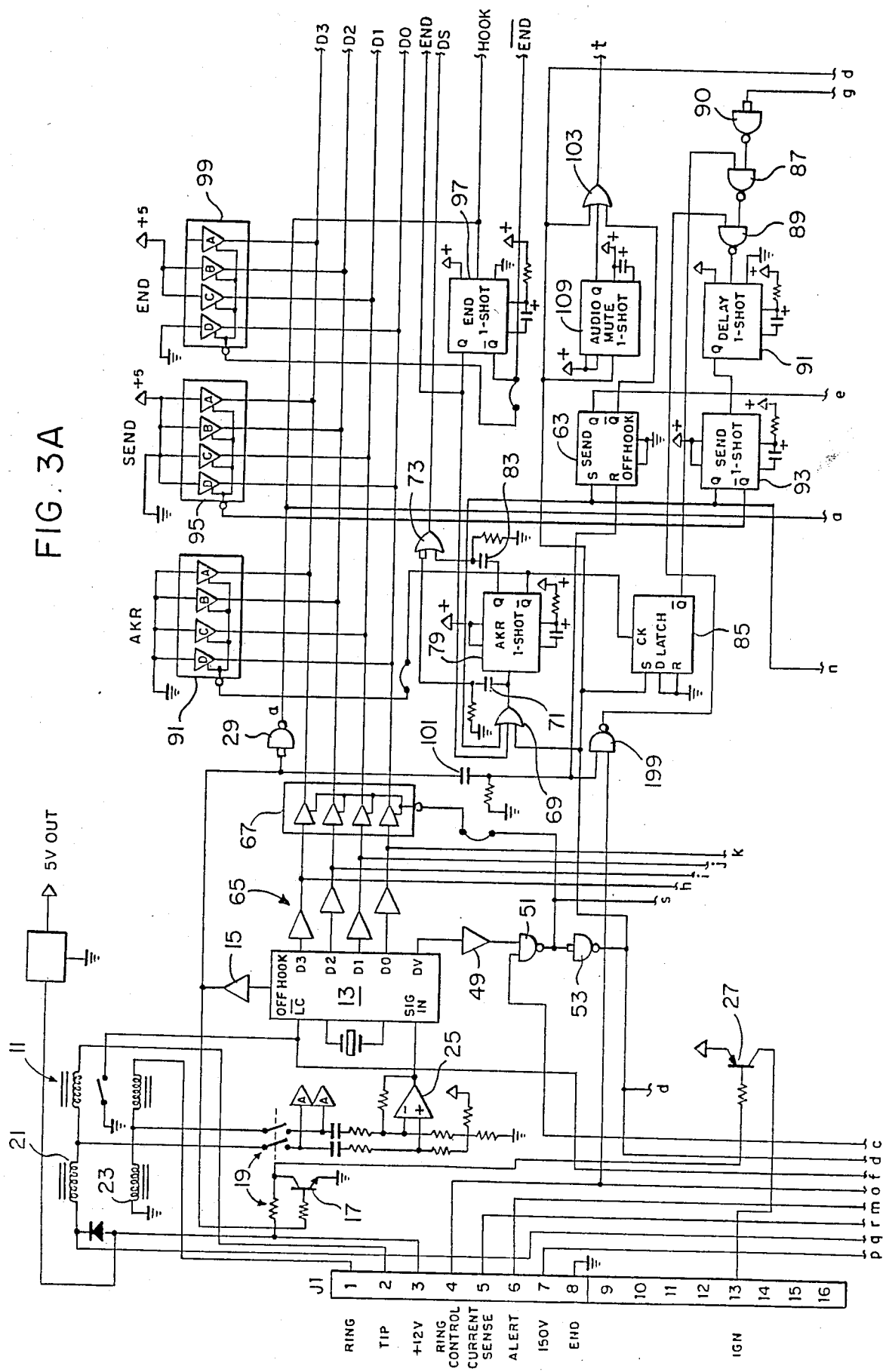
Figure 5:
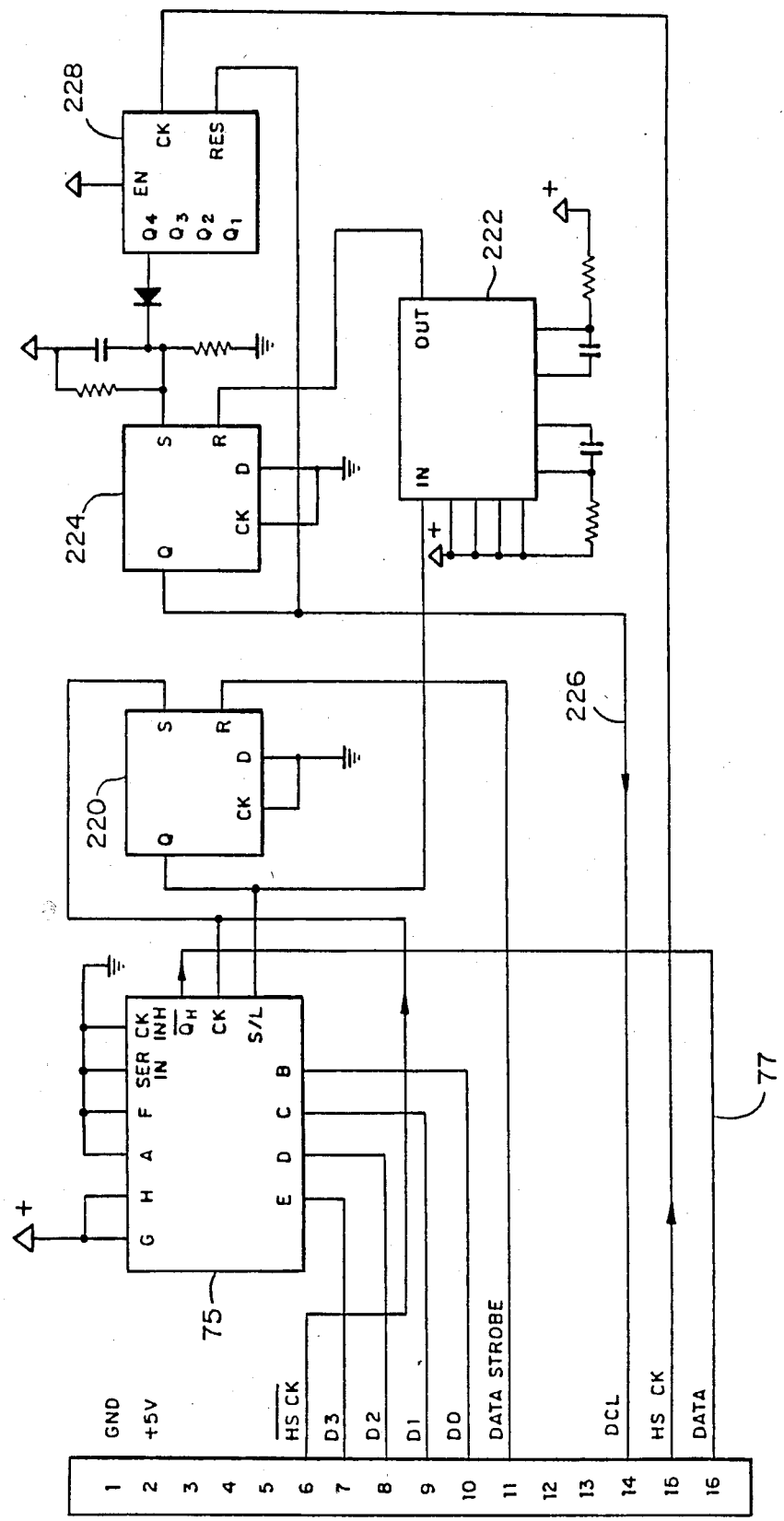
FIG. 5 is a schematic of the adapter board of the interface system of the present invention.

The telephone set 1 and the radio transceiver 3 are coupled by a programmable interface system 314 that, as disclosed in FIG. 2, includes three printed circuit boards called the interface board 5, the ring power supply board 7, and the adapter board 9. The programmable interfce system has been provided on distinct boards for convenience only and, as is apparent to one of ordinary skill in the art, the various functions of each of the boards may be combined in a single board or provided on multiple circuit boards depending upon the convenience of the user. The programmable interface board 5 is depicted in FIGS. 3A–3D, the power supply board 7 is depicted in FIG. 4, and the adapter board 9 is depicted in FIG. 5. The program flow chart for the microprocessor controlled dialing recognition circuit shown in FIG. 3C is depicted in FIG. 6.

Turning to FIGS. 3A–3D, a telephone, having ring and tip terminals, is connected to the interface board at J1, terminals 1 and 2. When the telephone is taken off hook, loop current flows and energizes the current sensing relay 11. The current sensing relay 11 has its normally open contact connected to a standard touch-tone/rotary dial decoder-converter circuit 13. Circuit element 13 is a Teltone M-948 DTMF receiver, although equivalent converter or decoder circuits could be employed. In particular, the current sensing relay 11 is coupled with the converter circuit 13 through the LC pin (which is also used to receive a pulse dialing input). This input also is used to indicate the off hood status which is provided to buffer 15 after an internal delay of approximately 200 msec. The output of buffer 15 turns on transistor 17, which energizes relay 19 to connect the telephone set, through modulation chokes 21, 23 to buffer 25. The output of buffer 25 is connected to the SIG IN pin of the converter 13. This provides tone-dialing inputs to the converter circuit 13. Further, the turning on of transistor 17 drives the base of transistor 27 low causing the transistor 27 to conduct. This connects the IGN terminal (J1-13) to a 12 volt level and permits outgoing calls.

Figure 3B:
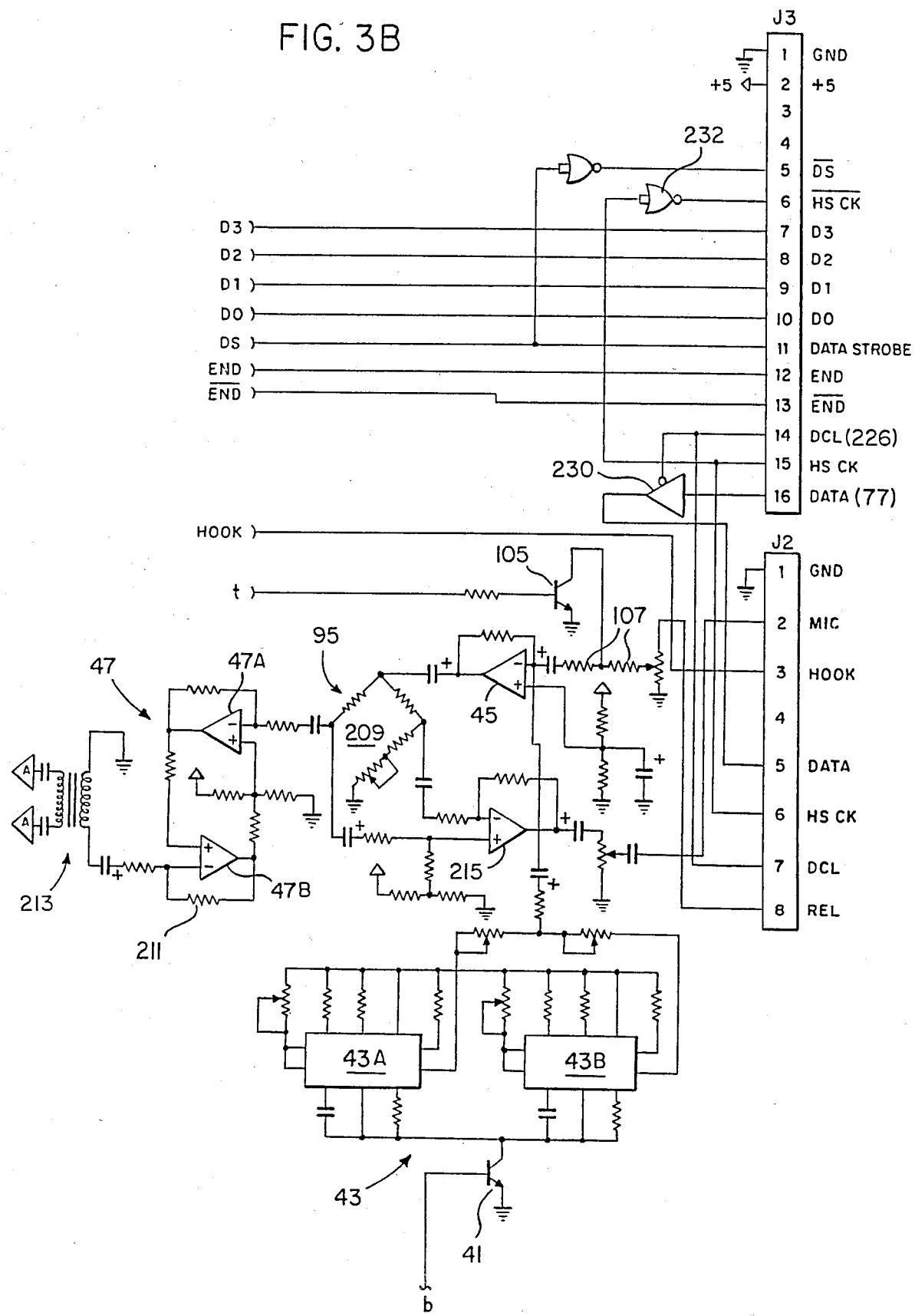
Figure 3D:
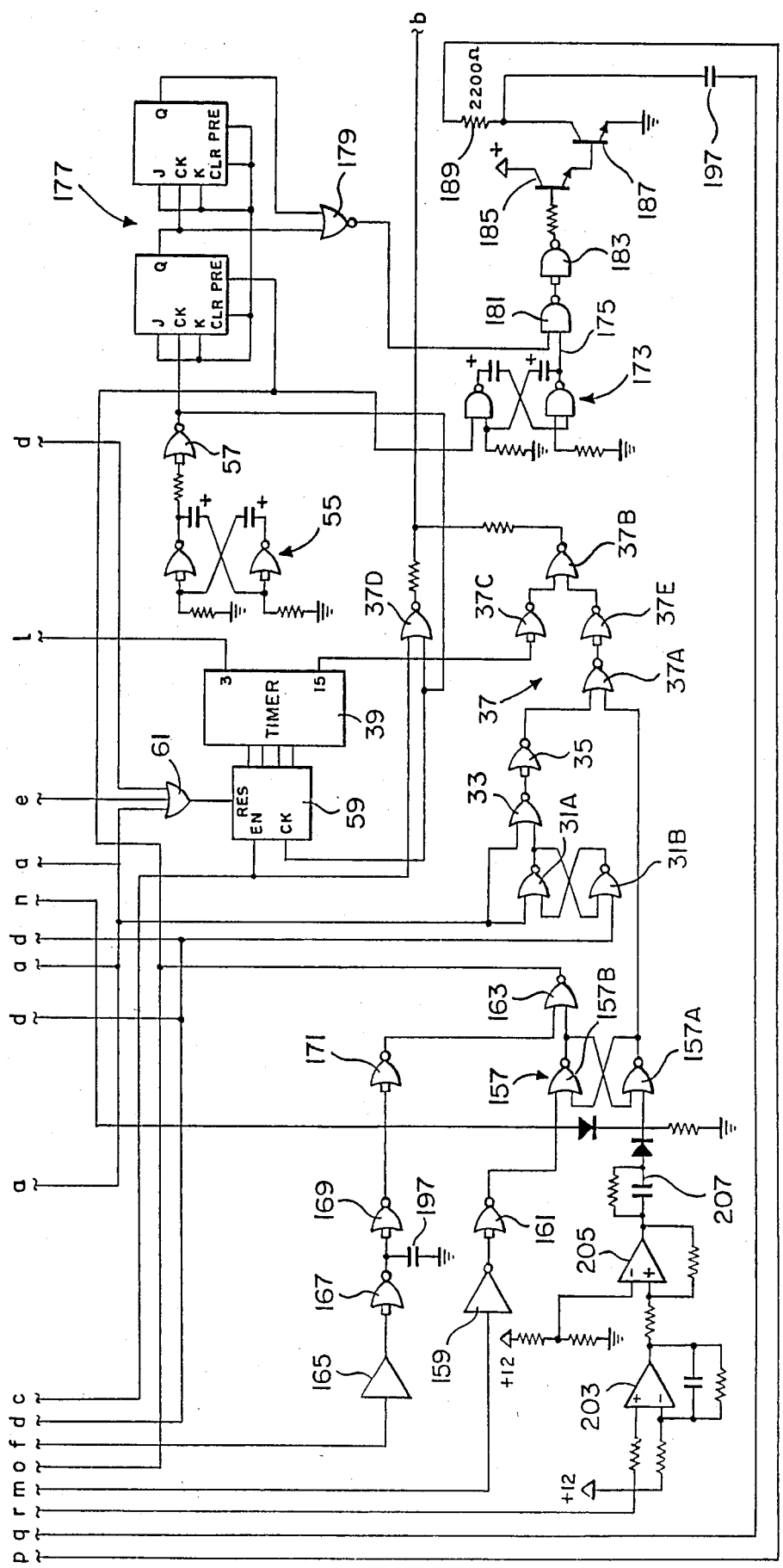

The buffer 15 is also connected to NAND gate 29, which has its output connected to one input of a latch circuit 31 (See FIG. 3D). Latch circuit 31 includes NOR gates 31A and 31B. When the telephone handset was last hung up, the NAND gate 29 (an inverter) had reset the latch 31, leaving the output of the latch 31 low. When the handset was then taken off hook, thus providing a low output at the inverter 29, the low output is connected to an input of NOR gate 33, which takes the output of gate 33 high. Inverter 35, which is connected to the output of gate 33, thus, has a low output. The output of inverter 35 is coupled with a series of logical NOR gates 37. Gate 37A has its other input connected with an alert latch circuit 157 to be described. Suffice it to say that the input from latch 157 to 37A is low at this time. Thus, the two low inputs of gate 37A causes the output of gate 37B to be high, which turns on transistor 41 (FIG. 3B). Gate 37B output is high until a timer, concisting of a counter 59 and a decimal decoder (or converter) circuit 39, has counted 15 seconds.

The turning on of transistor 41 provides a ground return path for a dial tone generator 43. The dial tone generator 43 includes a 350 and 440 Hz sinewave generator, 43A and 43B, whose outputs are coupled to the input of a hybrid circuit 95 at amplifer 45. The dial tones are provided through a path from amplifier 45 through the op amp buffer 47 and to terminals A—A, which are, in turn, provided to the telphone via the tip and ring contacts giving a dial tone in the telephone receiver.

As previously mentioned, dialing may be accomplished by either touch-tone or rotary dialing, deending upon the standard handset available. In either case, the particular telephone numbers that are dialed are decoded by the converter circuit 13. The numerals dialed are converted to a binary coded decimal output which is provided at outputs D3, D2, D1 and D0 of converter 13. For simplicity, only tone dialing will be described hereinbelow, it being recognized by one of ordinary skill in the art that pulse dialing could also be decoded by the circuit 13.

When the touch-tone buttons of the handset are depressed, the tones are provided through buffer 25 and to the SIG IN input of circuit 13. Output DV of converter circuit 13 goes high whenever such dialing occurs, i.e., whenever a handset button is depressed. The output at DV is connected to a buffer 49 and on to a NAND gate 51, which is, in turn, connected to a NAND gate inverter 53. The other input to gate 51 is from the timer 59, 39. This input to gate 51 is high unless the timer 59, 39 has counted 15 seconds, in a manner to be described.

The output of inverter 53 is connected to latch circuit 31, at the input of gate 31B. This sets the latch 31 upon a high output of inverter 53. This high output occurs as soon as a key on the telephone set is pushed and dialing commences. The setting of latch 31, via the NOR gates 37, turns off transistor 41 and, thus, turns off the dial tone generator 43. Thus, as soon as dialing commences, the dial tone generator 43 is turned off.

The programmable interface system also provides for a reorder tone in the event the system stays off hook for more than a predetermined time period. Multi-vibrator 55 (FIG. 3D) is provided having a one-second period. Multi-vibrator 55 is coupled through inverter/buffer 57 to a binary counter 59. The binary counter 59 has its output terminals coupled to the decimal converter 39. The reset terminal of the counter 59 is connected with the output of an OR gate 61. The inputs to the OR gate 61 are connected to the output of the inverter 29 (indicating off hook), the inverter 53 (from DV pin of converter 13) and to the output of a SEND flip-flop 63, described further below. The counter 59 continues to count until reset by any of the three inputs to the OR gate 61. In the event the timer 39, 59 counts the 15 seconds during which the phone is off hook and no dialing occurs, the input to gate 51 goes low and its output goes high; thus, changing the state of the DV inverter 53. Further, the decoder 39 low output is provided to EN input of counter 59 to stop the counter 59. Still further, the 15 second output of the decoder 39 iis provided as inputs to gates 37C and 37D. The output of gate 37C, through gate 37B, causes the dial-tone generator 43 to be disabled. The output of gate 37D, on the other hand, turns transistor 41 on and off at one-second intervals. Thus, a one-second interval dial tone is presented by the dial-tone generator 43, to the amplifier 45, across terminals A—A and to the telephone set. This reorder tone continues until the telephone set is hung up before dialing can be attempted again.

Turning to the dialing function, as each numeral is generated by the telephone handset, and the tones reflecting such numerals are presented to the SIG IN input of converter 13, the tones are decoded to BCD format and provided to terminals D0, D1, D2 and D3, through buffers 65, and to a TRI-STATE buffer 67. As each number or digit is dialed, the output of gate 51 goes low and enables the TRI-STATE buffer 67 to connect the data from the converter circuit 13 to the data lnes and to junction J3 (FIG. 3B) to the adapter board (FIG. 5). Simultaneously with the dialing of each digit, and the output of DV inverter 53 goes high, the high output from inverter 53 is provided to OR gate 69 to form a positive DATA STROBE pulse that propagates through capacitor 71 and OR gate 73, to DS terminal J3-11. This DATA STROBE pulse is provided to the adapter circuit, and will be described in further detail below. Suffice it to say for now, that each numeral, as dialed, is provided to a shift register 75 on the adapter board wherein the numerical data is converted to serial form and sent out over the data line 77 and, ultimately, to the transceiver via terminal J2-5. The serial data, indicative of the numbers to be dialed, is stored in the transceiver in its customary manner for ultimate transmission when a SEND signal is provided.

Separating each numeral that is provided to the transceiver is a particular predetermined code called the ALL KEY RELEASSED (AKR) signal. This is provided in the following manner. When a button on a telephone set is released, the DV output of converter 13 goes low which, in turn, provides a low output from DV inverter 53. Simultaneously, the output of gate 51 is high, which disables the TRI-STATE buffer 67 and disconnects any numerical data from the data lines. A negative pulse is thus formed at capacitor 71, which triggers a one-shop, call AKR one-shot 79. A 200 msec. duration pulse is provided at the Q output of the AKR one-shot 79. At the same time, the $\overline{Q}$ output goes low and enables the TRI-STATE buffer 81, which connects the predetermined code for AKR stored therein to the data lines. The 200 msec. pulse at the Q output of one-shot 79 is provided through capacitor 83 to OR gate 73 to provide a positive DATA STROBE (DS) pulse at the beginning of the AKR code transmission.

After the proper number of numerals or digits are dialed, which is automatically determined in a manner to be described below, it is necessary to deliver a SEND coded signal over the data lines and, ultimately, to the transceiver to instruct the transceiver, in its customary manner, to transmit the number dialed, i.e., the numbers stored in its memory. In conventional mobile cellular radio systems, the SEND code is generated manually by the user of the system after he has dialed the proper number of digits and has visually determined that the number is correct. The user then pushes the SEND button, which is detected by the transceiver, and the information is sent. Since there is no comparable send button on a standard telephone set, the determination of when the send code is to be generated is determined logically, as will be described below. Different countries have different telephone logic requirements. The ability to program the programmable interface system to adjust for these different requirements allows a single interface system to be used throughout the word.

The SEND code is transmitted in the following manner. When a digit is dialed, a DV-AKR latch 85 is set by the output of DV inverter 53. The $\overline{Q}$ output of latch 85 goes low and remains low until the trailing edge of the AKR one-shot pulse clocks the CK input of latch 85. The resetting of the latch 85, after the AKR pulse, causes the $\overline{Q}$ output of latch 85 to go high. This high output is coupled to the input of NAND gate 87.

When the last numeral or digit has been dialed, as determined in a manner to be described below, the input to inverter 90 goes low. The output of inverter 90 goes high, and is provided to a second input of inverter 87. The output of inverter 87, after the AKR is sent, thus goes low. Therefore, the output of inverter 87 is low after all digits or numerals have been dialed and the last AKR pulse has been triggered.

The output of gate 87 is provided as an input to gate 89. The output of gate 89, thus, goes high and triggers a delay one-shot 91. After 200 msec., the Q output of the delay one-shot 91 goes high to trigger a SEND one-shot 93 with its trailing edge. The $\overline{Q}$ output of SEND one-shot 93 enables a TRI-STATE buffer 95, which has a predetermined SEND code encoded therein. Upon triggering of the buffer 95 by the SEND one-shot 93, the predetermined SEND code is provided to the data line. At the same time, the Q output of SEND one-shot 93 is provided as an input to OR gate 69 whose output, through capacitor 71, creates a positive DATA STROBE pulse through OR gate 73 to the DATA STROBE (DS) line at J3, pin 11. This DATA STROBE pulse goes to the adapter circuit board. The trailing edge of the Q output of SEND one-shot 93 triggers the AKR one-shot 79 and provides an AKR code over the data line in a manner as previously described. Similarly, a DATA STROBE pulse is sent, via capacitor 83 at the beginning of the AKR one-shot cycle.

It should be appreciated that the AKR code is sent over the DATA line, and ultimately to the transceiver, after each piece of information is transmitted. That is, after ech numeral is transmitted, after the SEND code is transmitted, etc. This provides a separation for each piece of information so that the transceiver can distinguish the same. This AKR code is not, of course, used for those transceivers that do not include an AKR function. For example, the General Electric transceiver, identified as the "GE STAR," does not require the sending of AKR coded signals between each numeral or send information. With the GE system, the strobe pulse is used as the marker to separate distinct pieces of information.

After the SEND code is provided, followed by the AKR code is required, the transceiver completes the connection. That is, as is well-known to those skilled in the art, the transceiver transmits in high speed digital fashion, the phone number information of ultimate receipt by the telephone office to permit interconnection with the telephone network and to call the desired party. Once the call is complete, an audio connection between the telephone set and the transceiver is provided via the two to four wire hybrid circuit 95. Full duplex operation ocurs. Audio in, from the transceiver is provided over terminal J2 line 8, and audio out to the transceiver is provided through J2, pin 2. It is well known and should be apparent that cellular-type transceivers have a separate audio in and audio out channel. This is in contrast to conventional telephone sets where both the audio in and audio out occurs over a single channel. Thus, the hybrid circuit 95 converts the two channel, four-wire connection with the transceiver, to a single channel, two-wire connection, through pins A—A, to the telephone handset.

The audio channel, from the transceiver to the interface system, is provided over two-wire connections from terminal J2, pins 8 and 1; the audio channel from the interface to the transceiver is provided from terminal J2, pins 1 and 2. Audio from the transceiver passes through amplifier 45, through a bridge circuit 209, and through the op amp buffer 47. In particular, the aduio passes through amplifier 47A, the output of which is connected to the input for amplifier 47B. A feedback path from amplifier 47B, through resistor 211, is provided through transformer 213 and across the tip and ring contacts J1-1, 2, via terminals A—A.

The audio channel from the telephone set is provided from the tip and ring contacts J1-1, 2 via terminals A—A, through transformer 213, and as an input to amplifier 47B. The output of amplifier 47B is provided as an input to amplifier 47A, the output of which is fed back, and to the input of amplifier 215. The audio output of amplifier 215 is provided to the transceiver via terminal J2, pin 1.

After a conversion is completed, and the telephone handset is hungup (placed on hook), an END code is provided over the data lines and to the transceiver to signify the end of a call. This is accomplished as follows. First the off hook terminal of the converter circuit 13 goes low, which provides a high signal at the output of gate 29 (via buffer 15). The high output of gate 29 is provided as an input to END one-shot 97, which triggers a 200 msec. pulse. The Q̄ output of the END one-shot 97 enables the TRI-STATE buffer 99 to provide a predetermined END code signal over the data line. The Q output of one-shot 97 is provided through OR gate 69 to cause a positive pulse through capacitor 71 to, in turn, provide a DATA STROBE pulse over the data line as previously described. Upon completion of the END one-shot pulse, the trailing edge of the pulse triggers AKR one-shot to generate an AKR code over the data line as previously described.

It should be noted that during the period of time that a telephone number is being dialed, but prior to the triggering of the SEND code, the telephone handset is off hook. Thus, some means for inhibiting audio, which may be coming in from the transceiver, is required. Further, after the SEND code is generated, some means is required for inhibiting the reorder tone. This is accomplished in the following manner. When the SEND one-shot 93 is triggered, to cause a SEND code to be provided over the data lines, the SEND one-shot 93 sets a SEND flip-flop latch 63. This is, the Q output of the SEND one-shot 93 is provided as an input to the SEND latch 63. The SEND latch is reset by a pulse generated through capacitor 101, which is coupled to the off hook buffer 15. Thus, when coming off hook, the SEND latch 63 is reset and is set by actuation of the SEND one-shot 93. When set by the SEND one-shot 93, the Q output of latch 63 is provided as an input to OR gate 61 which, in turn, resets the binary counter 59 (FIG. 3D). The binary counter 59 is held reset and prevents further timer operation after the connection is made with the cellular transceiver, so that the reorder tone will not occur. It should be noted that prior to the setting of the SEND latch 63, the Q̄ output of latch 63 will be high and is provided through OR gate 103 to a transistor 105 (FIG. 3B). The transistor 105 is turned on and provides a ground connection for the pair of resistors 107 to inhibit the transmission of audio from terminal J2, pin 8 through the hybrid circuit 95. Thus, the audio channel from the transceiver is muted until a SEND code occurs.

Further, the receiver audio is muted when a telephone key is pressed and for 200 msec. afterward. This is accomplished by the output of DV inverter 53, coupled to an audio mute one-shot 109 and to OR gate 103. Thus, when a key is pressed, the audio is muted for at least 200 msec. thereafter. This muting during key depression is needed when the telephone set keys are depressed after an audio connection with the transceiver is made. Frequently, tone generated signals are used as codes to a bank computer, etc. The transceiver is capable of detecting the digits after a SEND code is sent and regenerating and transmitting the tones. Such regeneration tones will also be "heard" over the connected audio channel unless muted.

Let us now consider now the programmable interface system can be programmed to automatically determine when a SEND code is to be provided to the data lines and, hence, to the transceiver. This is, we will now consider how the system is programmed pursuant to the invention to determine that the proper number of digits has been dialed. The programmed SEND system described in FIG. 3 has been set up for a United States telephone system.

The instant system determines when the last digit or numeral of a telephone number has been dialed and, thus, when to provide the SEND code to the data line by looking at various initial digits or numerals of the telephone number, and determining if a "0" or "1" is located in these first few digits. A logical analysis is conducted from this information. In order to design a logic to make the proper determination, one must known the various combinations of "1's" and "0's" that are typically used in a telephone network and design the system accordingly. In the present case, the following logic is designed into the system, using the U.S. phone system.

If the first digit or numeral is "0," and no further numerals are dialed within a certain time say, for example, three seconds, then a local operator call is assumed and the SEND code is initiated. If the first digit is "0" or "1," followed by three digits, the latter two of which are "1," or if only three digits are dialed and the later two are "1," then it is assumed that a 911 emergency call or 411 directory assistance call is being dialed, and a SEND code immediately follows. Otherwise, if the first digit is "0" or "1," then it is assumed that a long distance call is being dialed, including an operator-assisted long distance call such as a credit card call. In such case, seven more digits can be dialed before a SEND code is sent. If "1" or "0" is dialed first, and additionally the third digit is "1" or "0," an out-of-area long distance call is assumed, and a total of eleven digits are allowed before a SEND code is sent. Additionally, in this case a 3-second timer is started, which will cause a SEND code after the seventh digit if no further dialing occurs, to accomodate office codes which have "1" or "0" in the second position, i.e., 802-1111. If, on the other hand, international dialing is to be accomplished, the international dialing is prefixed by 011. In such case, the SEND code is generated when an eight-second gap occurs after a digit is dialed. In international dialing, one cannot assume a predetermined number of digits and, thus, a timing operation has to be relied upon.

The above assumptions, as stated before, are exemplary of the U.S. phone system. In essence, the present invention determines whether the above-described conditions are met and, if so, a low signal is provided at the input to gate 90, to thus initiate a SEND code. The logic provided can be programmed according to the particular telephone network in use. This programming can be done in many instances at the factory prior to shipment of the interface system or can be programmed in the particular country where the interface system is used. In the present case, the determination to trigger the SEND code is made by a software programmable series of logical steps. It should be recognized, to those of ordinary skill in the art, that a microprocessor-based system could also be used without the use of an external EPROM, wherein the logic decisions are configured in the internal ROM of the microprocessor.

The outputs, h, i, j and k, of the touch-tone rotary dialed decoder-converter circuit 13, shown in FIG. 3A, are coupled to a data bus 111. Decoder Circuit 13 translates rotary telephone tones or pulses into BCD (Binary coded decimal) signal. At the same time, through line DV of circuitry 13, a pulse is sent via buffer 49 and NAND gate 51 to TRI-STATE buffer 67, which indicates that the data is valid after each digit is dialed. The output of the TRI-STATE buffer 67 is identified as lines D0 through D3 as shown in FIG. 3A, and is coupled to the adapter board 9. Outputs from the TRI-STATE buffer 95 previously described, are also coupled to data lines D0 through D3, which provides the predetermined code signal to activate the SEND signal to adapter board 9. When the TRI-STATE buffer 95 receives a signal from SEND one-shot 93, the SEND code will be transmitted to the adapter board via D0 through D3. To determine when the SEND code shall be sent, the information received on the data bus 111 from the pulse-dialed decoder must be interrogated. Thus, data bus 111 is coupled to a Motorola microprocessor chip 113. Microprocessor 113 has a crystal 114, which provides the independent running time clock for the microprocessor 113. Microprocessor 113 is constantly sampling the input on data bus 111. Microprocessor 113 will determine what the digits are and will count the digits, depending upon their sequence, what and how many the actual digits are, and will determine whether a dialing sequence has been completed. The microprocessor 113 can have pre-programmed software burned into its resident memory for providing the logic for determining when the last digit has been dialed. However, in this embodiment of the invention, chip 113 will have an external EPROM 115 program to determine when the last digit has been dialed. For example, whether the number being dialed is an international call, such as 011; whether an operator is being called; whether an area code is being called; or, depending upon the country, what the attributes of that country may be for international, local and emergency calls. Therefore, microprocessor 113 through logic contained on external EPROM 115 is constantly making comparisons, as shown in the flow chart identified in FIG. 6, which will be described below in greater detail. Crystal 114 avoids the need for an external clock circuitry. Thus, circuitry 113 is a self-contained microprocessing system with few external components. Circuitry 113, 114 and 115 together may, for example, be checking for "0" as the first digit, and no other digits since if this is the case, there would be no further dialing as a SEND signal would then be sent to the transceiver. If the dialing sequence continues to produce digits after three seconds, the circuitry 113 will determine whether a "0" plus a particular type of call is occurring, and circuitry 113 will be looking for seven more digits and if there is an area code. There will not be an area code dialed at all times; some office codes and local telephone offices have "0" in the middle of the first three digits, for example 601, 305, 301. The exact programmable logic for providing this sensing is shown in the flow chart of FIG. 6.

The Motorola 6801 microprocessor contains a read-only memory (ROM). As shown in FIG. 3C, there is provided the external EPROM (eraseable programmable read-only memory) 115, which forms a logic loop 117. The 6801 chip, may contain a ROM, which has been pre-programmed at the 6801 chip factory.

Logic and and timing for controlling the microprocessor 113, such that an output at a bus 119 is coupled to an address decoder 121, is provided by logic loop 117. Output 119 of microprocessor 113 is constantly being monitored by circuitry 115, along a bus 127, which is coupled to the bus 119. The output of microprocessor 113 on bus 119 is coupled to address decoder 121, which decodes the information obtained from microprocessor 113, and provides a low pulse "SEND" to the input of inverter 90 through line input g, shown in FIG. 3A. The pulse output is shown at an output line 123. The address decoder 121 is also used to select the use of external EPROM 115, in those configurations which use EPROM rather than the ROM which is contained in microprocessor 113. This is done through line 125 connected to the ENABLE input of EPROM 115.

Reference is now made to FIG. 6, which shows the flow chart logic for the software contained in logic loop 117. Information is received at logical entry point 2001, where a program start sequence for the microprocessor 113 has occurred. An Operation GET DIGIT INPUT 2002 represents the input of lines D0–D3 shown on bus 111 in FIG. 3C. The logic software looks at binary input data which appears at GET DIGIT INPUT 2002 and, when the data appears on the line, the information will be stored. An Operation GET COUNT 2003 looks at the output of GET DIGIT INPUT 2002 and provides an output which represents the number of digits dialed up to that point. As the number of digits increase, the output of Operation GET COUNT 2003 increases incrementally. Following GET COUNT box 2003 is an Operation STORE DIGIT 2009. Here the digits are stored, as dialed, in a RAM (random access memory) storage location contained within microprocessor 113, with the first digit located at location 0, the second at location 1, etc. After Operation STORE DIGIT 2009 follows a logic 3 RESTARTS? 2004. If the "0" or "1" signal is received, logic 3 RESTARTS? 2004, as a result of a subsequent logic loop, will count the number of restarts, i.e., the number of times "0" or "1" is the first digit dialed. Once there are 3 RESTARTS, i.e., the first 3 digits are 0's or "1's," a "yes" signal will be provided to an eight-second timre operation 2010 to start an eight-second timer. If there have been no restarts, or less than 3 RESTARTS, a "no" signal will be provided to logic 1st DIGIT=0? 2005. The restart logic operation can be set for any number of restarts, for one, two, three, four or five, depending upon the requirements of a particular country. For example, 011 requires three RESTARTS to determine whether an international number is being called. Thus, the first number through will have a "no" signal from logic 3 RESTARTS 2004, is coupled to a logic 1st DIGIT=0?, which looks at the first digit to determine if it is a "0." If the first digit is a "0," a "yes" output will be sent to start a THREE-SECOND TIMER 2006, which starts a three-second timer. This allows a call to the operator if no further dialing occurs within 3 seconds. If an additional digit is received within the three seconds, a logic DIGIT INPUT? 2007 will provide a "yes" "restart" output which is coupled back to restart GET COUNT 2003. GET COUNT 2003 is restarted and set to "0," the input is sent to a "0" count. At the same time, logic 3 RESTARTS? 2004 is incremented by one. STORE DIGIT 2009 is storing the current digits as dialed, and when logic DIGIT INPUT? 2007 says "yes," STORE DIGIT 2009 stores the digit. A similar sequence occurs if the first digit is "1," except that the restart occurs in logic 2012, which returns the program to GET DIGIT INPUT 2002. In either event, dialing a "0" or a "1" is a RESTART. The logic loop, comprising 2009, 2003, 2004, 2005, 2006 and 2007 for "0" first; or 2002, 2003, 2009, 2004, 2005 and 2012 for "1" first will go through 3 RESTARTS. Once the 3 RESTARTS have been obtained, a logical "yes" is sent by 3 RESTARTS? 2004 to an EIGHT-SECOND TIMER 2010, which starts an eight-second timer. The eight-second timer is provided time for more digital input after the first three digits. If a digital input is present during the eight-second period, logic DIGITAL INPUT? 2011 couples a logical "yes" to GET COUNT 2003, which is then reset. The digits now being interrogated comprise the actual phone number. In this way, international calls will not have their digits stored in STORE DIGIT 2009 and, after there has been no digital input for eight seconds, logic step 2011 will provide a "no" signal which actuates SEND LOGIC 2008. The SEND signal sent out from SEND logic 2008 is the pulse output 123 of address decoder 121 in FIG. 3C. Under normal operations, if there are no "0's" or "1's" in the number, the seven digits will be stored in STORE DIGIT 2009, and the sequence of digits will be sequentially forwarded down past 3 RESTARTS 2004, to the logic circuitry following 1st DIGIT=0? 2005. The first digit will be interrogated by 1st DIGIT=1? 2012 to determine if the first digit is a "1" for a long distance call. If it is not a "1," there will be a "no" output coupled to logic 1st DIGIT=9? 2013. Logic 2013 is looking for a "9" in the first digit. Logic 2012 is used to determine if there is a "1" in the first digit to determine if a long distance number is being dialed. Logic 2013 senses for a "9" in the 1st DIGIT to determine if an emergency number is being called, such as 911. Logic 2005 in conjunction with DIGIT INPUT? 2007 is looking for a "0" to determine if the operator is being dialed, or if there is an international or long distance call.

It is easy enough to reprogram these logic decision points for various corresponding numbers in each country to determine what number in the sequence of numbers to look for determinations as to emergency, long distance, international calls, and so forth. If the first digit contains a "9," logic 2013 will provide a "yes" output, which is then coupled to a second digit determinator, 2nd DIGIT=1? 2014. If the second digit is not a "1," a logic "no" output will be provided by logic 2014, which is then coupled to an INCREMENTAL COUNTER 2015. INCREMENTAL COUNTER 2015 is used to count the number of digits that are being received. Counter 2015 output will be provided to LOGIC COUNT=10? 2016. It at any time, the INCREMENTAL COUNTER 2015 provides a count output equal to ten, COUNT OUTPUT=10? 2016 will provide a "yes" output to SEND operation box 2008 and which will the cause the "SEND" signal to be transmitted as described above. The output of SEND 2008 is produced by line 123 of address decoder 121. If the number of digits being received is less than ten, a "no" signal will be provided from COUNT=10? 2016 to a LOGIC COUNT=7? 2017. For the first six digits that are interrogated at 2017, a "no" signal will be provided to the input of GET DIGIT INPUT 2002. Once the digit count is equal to seven, a "yes" output is coupled to a logic 2nd DIGIT=0 or 1? 2019, which is looking for a "0" or "1" in the second digit. Logic 2019 is used to determine if the second number indicates an area code. If the second digit is a "0" or "1," a "yes" output is provided to a THREE-SECOND TIMER 2020, which starts a three-second timer. If more digits are dialed within that three-seconds after the second digit is received, the program returns to GET COUNT 2003, and 2009 continues to store the digits. If there are no more digital inputs within the three seconds, then digital input? 2021 will provide a signal to SEND 2008, allowing the "SEND" signal to be sent. In this case, the number sent will be of the type previously mentioned, in which the second digit of the office code is "1" or "0." This might have represented an area code for long distance, but there only seven digits are entered, or "1" or "0" plus seven digits. Logical loop comprising logic 2013 and 2022 are used to determine the 911 area codes or 411 information number, when used in conjunction with logic loops comprising by 2022, 2014 and 2018. If a "4" is contained in the first digit, a "1" in the second digit, and a "1" in the third digit a "yes" signal is provided to SEND 2008 and stored numbers 411 or 911 will be coupled to the transceiver for transmission.

The above-described flow chart for the software allows the microprocessor to have its logical sequences reset and adjusted to fit any country's specific calling sequences and telephone nuances. For example, some countries only have four numbers in their telephone numbers, and the logic provided in this flow chart can be adjusted to sense for only four numbers. As an example, logic 2022 in the current description, is looking for a 411 configuration for information. If the system utilizes a "123," for information such as in Puerto Rico, or a 119, such as the British Virgin Islands then, for example, logic 2013 would be looking for a first digit as a "1," and logic 2014 will be looking for a second digit as a "2," and logic 2018 will be looking for a third digit as a "3." Therefore, logic 2012 would not provide a reset of operation 2002 on a "1," but would be deactivated. Similar changes can be provided for Puerto Rico for the numbers 119. In a similar manner, the logic can be reprogrammed to look for 998 in the British Virgin Islands for hospitals, 999 for police, and 119 for information. In Puerto Rico, to dial direct the number there is prefixed 137 if the call is made within the dialing area code; 137 plus the area code if the call is being placed outside the calling area code; 130 for operator and 134 for an international call. By using the teachings of this invention, the logic can easily be reprogrammed to fit all of the above-described special needs of each country.

The following is a software program written in 6809 Assembly Language, and is the logic programmed into EPROM Logic Loop 117 of FIG. 3C in conjunction with a Motorola 6801 microprocessor. The code would have to be modified to conform to Motorola 6801 instruction code to be used on a 6801 microprocessor.

```
1312  BD  A928       00100  START  JSR   $A928      CLEARSCREEN
1315  0F  6F         00110  INIT   CLR   $6F        INITIALIZE DISPLAY
1317  8E  3000       00120  STOR   LDX   #$3000
131A  C6  00         00130  ZERO   LDB   #0
131C  AD  9F A000    00140  TXT010 JSR   [$A000]    INPUT CHAR
1320  27  FA         00150         BEQ   TXT010     GO IF 0
1322  AD  9F A002    00160  TXT015 JSR   [$A002]    TEXT DISPLAY
1326  84  0F         00170         ANDA  #$0F       ELIMINATE ASCII
1328  A7  80         00180         STA   ,X+        STORE DIGIT AND INCR
132A  B6  3024       00190  CHECK  LDA   $3024
132D  4C             00200         INCA
132E  B7  3024       00210         STA   $3024
1331  F7  3025       00220         STB   $3025
1334  B0  3025       00230         SUBA  $3025
1337  81  03         00240         CMPA  #3
1339  25  07         00250         BLO   FIRST
133B  BD  139C       00260         JSR   LTIMER
133E  27  49         00265         BEQ   SEND
1340  20  E0         00270         BRA   TXT015
1342  B6  3000       00280  FIRST  LDA   $3000      1ST DIGIT
1345  81  00         00290  OPAST  CMPA  #0         1ST DIGIT =0?
1347  26  09         00300         BNE   LONGD
1349  8D  57         00310         BSR   TIMER      IF 0 GO TIMER
134B  27  3C         00320         BEQ   SEND       TIME OUT
134D  8E  3000       00330         LDX   #$3000
1350  20  D0         00340         BRA   TXT015
1352  81  01         00350  LONGD  CMPA  #1         1ST DIGIT=1?
1354  27  C1         00360         BEQ   STOR       THEN START AGAIN
1356  81  09         00370  EMERG  CMPA  #9         =9?
1358  27  04         00380         BEQ   SEC
135A  81  04         00390  INFO   CMPA  #4         1ST DIGIT=4?
135C  26  10         00400         BNE   COUNT
135E  B6  3001       00410  SEC    LDA   $3001      2ND DIGIT
1361  81  01         00420         CMPA  #1         =1?
1363  26  09         00430         BNE   COUNT
1365  B6  3002       00440  THIRD  LDA   $3002      3RD DIGIT
1368  81  01         00450         CMPA  #1         =1?
136A  26  02         00460         BNE   COUNT
136C  20  1B         00470         BRA   SEND
136E  5C             00480  COUNT  INCB             ADD TO COUNT
136F  C1  0A         00490         CMPB  #10        COUNT=10?
1371  27  16         00500         BEQ   SEND       SEND ON 10TH
1373  C1  07         00510         CMPB  #7         COUNT=7?
1375  26  A5         00520         BNE   TXT010     GO FOR NEXT CHAR
1377  B6  3001       00530         LDA   $3001      GET 2ND DIGIT
137A  81  00         00540         CMPA  #0         =0?
137C  27  04         00550         BEQ   JUMP
137E  81  01         00560         CMPA  #1         =1?
1380  26  07         00570         BNE   SEND
1382  BD  13A2       00580  JUMP   JSR   TIMER
1385  27  02         00590         BEQ   SEND       TIME OUT ON 7TH
1387  20  99         00600         BRA   TXT015
```

```
135E  8D       20        00030                 JSR    [$A000] DISPLAY 1 FOR SEND
138F  86       3000      00030                 LDA    #$3000
1392  6F       80        00040  CLEAR          CLR    ,X+
1394  8C       3025      00050                 CMPX   #$3025  32 NUMBERS+STORAGE
1397  26       F9        00060                 BNE    CLEAR
1399  7E       1317      00060                 JMP    STOR    START AGAIN
139C  108E     1F40      00071  LTIMER         LDY    #8000
13A0  20       04        00072                 BRA    LOOP
13A2  108E     0BB8      00080  TIMER          LDY    #3000
13A6  86       05        00090  LOOP           LDA    #5
13A8  4A                 00100  LOP1           DECA
13A9  26       FD        00110                 BNE    LOP1
13AB  B7       3021      00120                 STA    $3021
13AE  10BF     3022      00130                 STY    $3022
13B2  AD       9F A000   00140                 JSR    [$A000] INPUT CHAR
13B6  26       0D        00150  BACK           BNE    RETURN
13B8  B6       3021      00160                 LDA    $3021
13BB  10BE     3022      00170                 LDY    $3022
13BF  31       3F        00180  TIM010         LEAY   -1,Y    DECREMENT Y
13C1  26       E3        00190                 BNE    LOOP
13C3  1A       04        00200  HERE           ORCC   #4      SET Z
13C5  39                 00210  RETURN         RTS
      0000               00220                 END
00000 TOTAL ERRORS

BACK     13B6
CHECK    132A
CLEAR    1392
COUNT    136E
EMERG    1356
FIRST    1342
HERE     13C3
INFO     135A
INIT     1315
JUMP     1382
LONGD    1352
LOOP     13A6
LOP1     13A8
LTIMER   139C
OPAST    1345
RETURN   13C5
SEC      135E
SEND     1389
START    1312
STOR     1317
THIRD    1365
TIM010   13BF
TIMER    13A2
TX010    131C
TX015    1322
ZERO     131A
```

© 1981 Telular, Inc.

Let us now consider how the system is activated to receive an incoming call. Conventional transceivers, such as those used in cellular rdaio, provide an alert signal to indicate an incoming call. In the present invention, the programmable interfacing system is used to convert the incoming alert signal to provide a ringing of the telephone handset. This is accomplished in the following manner.

When the telephone set is on hook, the current sensing relay 11 is open to the input pin $\overline{LC}$ of converter circuit 13. This causes the off hook output to buffer 15 to be low and, thus, the transistor 17 does not conduct and relay 19 remains open. Therefore, when the telephone set is ringing, in a manner to be described, the ring voltage is isolated from the SIG I input of converter 13. Since the transistor 17 is not on, that is, its collector if high, the transistor 27 does not conduct and the transceiver IGN lead at terminal J1-13 is disconnected from the 12 volt supply. This allows the alert signal sent from the transceiver to function.

The alert line, terminal J1-6, is connected to an alert latch 157, via buffer 159 and inverter 161. During the previous use of the phone, the alert latch 157 had been reset, at gate 157A, by the output from gate 157B. The output of the alert latch 157 is coupled to gate 163. The output of gate 163 is coupled with the ring control terminal at terminal J1, pin 4. The ring control terminal is connected to the ring power supply circuit in a manner to be described. When the alert latch 157 had been reset by the SEND one-shot 93, the output of gate 163 went low. An incoming signal at alert, terminal J1, pin 3, takes the line to ground or low, and this low signal is passed through the buffer 159 to gate 161 to provide a high output therefrom. This output sets the latch 157, the output of which goes low and this low output is provided as an input to gate 163. The other input of gate 163 is also low, since the phone is on hook and there is no loop current. That is, the contact of relay 11 is open and that line, connected to the input of buffer 165, goes high because of internal pull-up in the converter 13. Therefore, the input to gate 163, via the gates 167, 169 and 171, goes low. This, the output of gate 163 goes high, which is provided to the ring control terminal J1, pin 4.

The output of gate 163, i.e., the ring control line, when in a high state, enables a 20 Hz multi-vibrator 173 to produce a 20 Hz square wave at its output terminal 175. The one-second clock 55, 57 drives two JK flip-flops 177, to provide a two-second and four-second square wave respectively. These square waves are combined through OR gate 179 to provide a rectangular wave form of one second ON and three seconds OFF. This wave form is provided to NAND gate 181. The output of gate 181 then, is a 20 Hz square wave which turns ON for one second, and turns OFF for three seconds. The signal is inverted by inverter 183, which drives transistors 185 and 187 to chop 150 volts DC that is applied through the 2200 ohm resistor 189. The 150 volt DC is provided by a line connected through terminal J1, pin 7, which is connected to the ring power supply board seen in FIG. 4. Another method of detecting the incoming signal, which causes the phone to ring, is shown in FIG. 7. Referring to FIG. 4, it can be seen that the ring power supply board supplies 150 volts via a transformer coupled to a 23 volt power supply. Preferably, the 12 volt DC is provided by an AC to DC converter that converts 120 volt AC to the 12 volt DC. A 12 volt DC back-up power supply may also be provided to ensure operating voltage in the event of a power failure. The 150 DC is provided by the ring control output signal from gate 163, which is provided as an input at terminal J1, pin 4 of FIG. 4, which turns on a transistor 191 which, in turn, energizes relay 193, which switches on a 12 volt 150 volt DC transistorized converter circuit 195 to provide the 150 volts through terminal J1, pin 7.

The output from the collectors of transistor 187 is coupled to the telephone circuit through capacitor 197, to provide a 150 volt AC 20 Hz ring voltage to the telephone set. This causes a ringing of the telephone. Thus, the output of collector 187, through capcitor 197, is provided across the ring and tip terminals J1, pins 1 and 2, via coil 21, current sensing relay 11 and coil 23.

With the phone ringing, coming off hook causes current sensing relay 11 to close grounding the $\overline{LC}$ pin of converter 13. This grounding or low signal is provided as an input to buffer 165 which, through gates 167, 169 and 171, provide a high input to gate 163 and, thus, the output of gate 163, the ring control line, goes low. The gates 167 and 169, together with capacitor 197, prevent pulsation of current sensing relay 11 due to ring current from disabling the ring control while the phone is ringing and on hook. Coming off hook while the ring control is high, causes two high inputs to gate 199 (FIG. 3A), whose output then goes low. This low pulse is fed as an input to gate 89, causing the output thereof to go high. This fires the delay one-shot 91 which, in turn, fires the SEND one-shot 93, followed by the firing of the AKR one-shot 79, in a manner previously described. Thus, the SEND code signal is provided to the data lines and to the transceiver which, thus, completes the connection from the transceiver to the telephone central office. At the same time, the firing of SEND one-shot 93 resets the alert latch 157, as earlier described. Therefore, the lifting of the handset while the phone is ringing, disables the ringing and provides a SEND code to the transceiver to provide a connection with the telephone central office.

After the call is complete and the telephone set is hung up (on hook), an END code followed by an AKR code is provided to the transceiver, in a manner previously described.

If the telephone set is not answered during ringing, the ringing will continue until the calling party hangs up. At this point, ringing of the telephone set will cease.

Conventional transceivers of the cellular type draw approximately 3 amps when a call is received and an alert signal is generated. When the calling party hangs up, the transceiver current drops to about 1 amp. This difference in current is sensed and used to control the ringing of the telephone.

In particular, the current drawn by the transceiver is provided to the power supply board (FIG. 4), via terminal P105, pin 2. A resistor 201, having a value of 0.03 ohms, detects the current and an output is provided through current sensing terminal J1-5. This sensed current is provided as an input to DC amplifier 203 (FIG. 3D), the output of which is provided as an input to comparator 205. The developed voltage amplified by amplifier 203 is applied to comparator 205 to give a high output for a low current and a low output for a high current. When the current drops from high to low, the capacitor 207 couples a positive pulse to reset the alert latch 157 when the current drops.

Turning to the adapter board circuitry (FIG. 5), parallel digital data, representing the numerals or digits dialed, is provided on the data lines D0–D3 as inputs to the shift register 75. The data is shifted out of the shift register 75 in a serial data stream over DATA line 77, for temporary storage in the transceiver until a SEND code is provided thereto, as previously described. This is accomplished in the following manner.

The inputs from data lines D0–D3 are presented at E, D, C and B terminals of the shift register 75. The inputs G, H, A and F are tied in predetermined high and low combinations, as depicted in FIG. 3. These eight inputs are shifted out over line 77.

When a DATA STROBE (DS) pulse is provided from terminals P3, pin 11, i.e., when the DATA STROBE line goes high, the high pulse resets latch circuit 220. The Q output of latch 220 then goes low, which low output is provided to the S/L input of shift register 75 causing the shift register to load the data line inputs from lines D0–D3. The negative edge of the Q output is provided to the inputs pins of a delay circuit 222. The delay circuit consists of two one-shot circuits in series. The delay circuit's OUT pin goes high one msec. after the Q output from latch 220 goes low, and the OUT pin stays high for one msec. This high from the OUT pin of delay circuit 222 resets the latch circuit 224, causing the Q output of latch 224 to go low, which sets the DCL (directional control line) line 226 low. The low Q output of latch 224 also disables the reset (RES) of a counter 228.

The low output on the DCL line enables a gate 230 (FIG. 3B) via terminals J3–P3, pin 14. This provides a path for the digital serial data from the shift register 75 to the DATA line of the transceiver, terminal J2, pin 5.

While the DCL line 226 is low, the transceiver (not shown) responds with clock pulses on HSCK line (this is the normal operating characteristic of NEC transceiver). That is, clock pulses from the transceiver are provided via terminal J2, pin 6 (FIG. 3B), to terminal J3 pin 15, and to terminal P3, pin 15. Similarly, the HSCK pulses are provided to an inverter 232 (FIG. 3B), and these inverted pulses are provided to terminal J3, pin 6, and then to terminal P3, pin 6 (FIG. 5). These $\overline{HSCK}$ pulses are provided to clock the shift register 75 at the CK pin thereof, and to set the latch 220. The Q output of latch 220 goes high, which is provided to the S/L pin of shift register 75. Data is shifted out of the shift register 75 (onto line 77). This shift of data continues until the counter 228 counts eight pulses. At that time, the Q4 output of counter 228 goes high and sets the latch 224, bringing the DCL line 226 high. This sequence is repeated for each eight-bit data word.

Referring to FIG. 7, the incoming ring signal audio from REC AUDIO line, pin 8, on connector J2 of FIG. 3B, is coupled to resistor 1001 to amplifier 1003.

The amplified signal is coupled to a clamp circuit 1005, which clamps the positive peaks of the amplified signal to five volts. The clamped signal output of clamp 1005 is coupled to inverter 1007 to invert and clean the signal. The output of inverter 1007 is coupled to a diode 1009 and then to a capacitor 1111 and resistor 1113 which together act to provide a five volt signal to a gate 1115, while a ring signal is present. The OFF HOOK output of circuitry 13 of FIG. 3A is coupled to GATE 1117, which acts as an inverter. When the telephone receiver is taken off the hook, circuitry 13 provides a "high" signal to output OFF HOOK. When the telephone receiver is not off the hook, a low signal is coupled to OFF HOOK output of circuitry 13. This OFF HOOK signal is inverted by gate 1117, and then coupled to gate 1115. Gate 1115 will provide a low signal output when the "RING" signal is present and the telephone is hung up. Gate 1115 will provide a high signal if the "RING" signal is present and the telephone is off the hook, or the ring signal is not present and the telephone is on the hook. The output of gate 1115 is coupled to an inverter 1119, the signal is inverted and is coupled to the multivibrator 173 shown in FIG. 3D through line "o". If the detecting means described in FIG. 7 is used, then circuits 55, 57, 177 and 179 can be deleted. The line representing the output of 179 would be coupled to a high or five volt power supply. Circuits 157, 165, 167, 169, 197, 171, 159, 161, 163, 203 and 205 can also be deleted, since the detecting circuitry described in FIG. 7, senses when a ring signal is present and will automatically stop when the incoming audio ring signal stops. The input to circuit 37A from deleted circuit 157A is coupled to "low". The previously described detecting circuitry provides an alternative method of detecting a "RING" signal. The advantages of the previously described detecting circuitry is that it uses less components, is more reliable, and the horn alert circuitry of the transceiver, P105 of FIG. 4, is not needed, thereby making the interface easier to use with the transceiver 3.

Although a specific embodiment of the present invention is disclosed, it should be understood, however, that this description is given for illustrative purposes only and alterations and modifications may be made without departing from the spirit, intent and scope of the invention defined by the appended claims.

What is claimed is:

1. A programmable telephone interface system for coupling a standard touch-tone/rotary dial telephone set with a radio transceiver used in a telephone communication system, wherein the transceiver is capable of radio communication with a remote radio transmitter-receiver system that is part of a telephone network, wherein the programmable interface system comprises:

telephone coupling means for providing a two-way communication link with the telephone set;

transceiver coupling means for providing a two-way communication link with the radio transceiver;

telephone number digital conversion means for receiving a group of touch-tone or rotary dialed telephone numbers from said telephone coupling means, converting the group of telephone numbers into digital data, and providing said digital data to said transceiver coupling means;

programmable determination means coupled with the telephone number digital conversion means for programmably determining the last number of the group of telephone numbers provided at said transceiver coupling means;

send signal means coupled with said programmable determination means for providing a send signal to the transceiver coupling means;

call detecting means for detecting an incoming call signal provided at said transceiver coupling means;

off-hook detecting means for detecting an off-hook signal provided at said telephone coupling means;

audio channel means for providing a two-way audio signal path between said telephone coupling means and said transceiver coupling means; and telephone simulation means coupled with said telephone coupling means for providing audio frequency ring tone and dial tone signals thereto.

2. A programmable telephone interface system according to claim 1, wherein said telephone number digital conversion means comprises means for converting each number of the group of numbers into a binary coded parallel output, parallel to serial converting means for converting the binary coded output into a serial digital data stream and for providing the serial data stream to said transceiver coupling means for storage in the transceiver.

3. A programmable telephone interface system according to claim 1, wherein said programmable determination means includes means for programmably determining if the numerical value of predetermined numbers of the group of numbers have a predetermined value or values.

4. A programmable telephone interface system according to claim 3, wherein said predetermined value or values is ONE or ZERO.

5. A programmable telephone interface system according to claim 3, wherein said programmable determination means includes means for determining the elapsed time following receipt of a number.

6. A programmable telephone interface system according to claim 1, wherein said programmable determination means includes a decimal decoder, clocking means for advancing the decimal decoder upon receipt of numbers from said telephone number digital conversion means, and decoding the numerical value of each number, whereby the numerical values of predetermined numbers are checked for a predetermined value or values.

7. A programmable telephone interface system according to claim 6, wherein said predetermined value or values in ONE or ZERO.

8. A programmable telephone interface system according to claim 1, wherein said telephone simulation means is responsive to the off hook signal of said off hook detecting means to provide a continuous audio dial tone frequency signal.

9. A programmable telephone interface system according to claim 1, wherein said telephone simulation means is responsible to the incoming call signal of said call detecting means to provide a periodic audio ring frequency signal.

10. A programmable telephone interface system according to claim 1, wherein said audio channel means includes a two-wire channel means connected with said telephone coupling means, a four-wire channel means connected with said transceiver coupling means, and channel coupling means for coupling two separate audio in/out channels at said four-wire connection means with a single audio in/out channel at said two-wire connection means.

11. A programmable telephone interface system according to claim 1, wherein said programmable determination means includes a programmable microprocessor.

12. A programmable telephone interface system according to claim 11, wherein said programmable microprocessor means includes an independent programmable memory device for storing logic information.

13. A programmable telephone interface system for coupling a standard touch-tone/rotary dial telephone set with a cellular-type radio transceiver comprising:
  a telephone number digital conversion means for converting a group of telephone numbers to digital data and for providing the digital data to the transceiver;
  programmable determination means for programmably determining the last number of the group of telephone numbers;
  send signal means coupled with said programmable determination means for sending a predetermined send code signal to the transceiver in response to the determination means determining the last number;
  call detecting means for detecting an incoming call from the transceiver; and
  ring frequency generating means responsive to the incoming call for providing periodic audio ring tone frequency signals to said telephone set.

14. A programmable telephone interface system according to claim 13, further comprising hang-up detecting means for detecting a hang-up condition from the telephone set and end signal means for sensing a predetermined end code signal to the transceiver in response to detection of the hang-up signal.

15. A programmable telephone interface system according to claim 13, wherein said telephone number digital conversion means includes a means for sending a predetermined coded signal to the transceiver upon the completion of each numeral of the group of numerals.

16. A cellular--type radio/telephone communication system having at least one remote radio station transmitter-receiver linked with a master cellular-type switching center which is in turn linked with a local telephone central switching office, wherein the remote radio station transmitter-receiver provides a wireless communication link with a base station transceiver, the improvement comprising:
  a standard touch-tone/pulse dialing telephone set;
  a cellular-type radio transceiver mounted at a fixed site;
  programmable interfacing means for programmably interfacing said telephone set to said transceiver, said interfacing means including,
    (a) power supply means for supplying DC voltage to said transceiver;
    (b) telephone number digital conversion means for converting touch-tone dialed/pulse-dialed telephone numbers from said telephone set to digital data for temporary storage;
    (c) programmable sending means for enabling said transceiver to transmit the digital data; and
    (e) telephone simulation means for providing ring-type and dial-tone type tone frequency signals to the telephone set.

17. The communications system according to claim 16, wherein the cellular-type radio transceiver includes a directional antenna directed to the remote radio station transmitter-receiver.

18. A programmable telephone interface system for coupling a standard touch-tone/rotary dial telephone set with a radio transceiver used in a telephone communication system, wherein the transceiver is capable of radio communication with a telephone network, wherein the programmable interface system comprises:
  telephone number digital conversion means for converting a group of telephone numbers to digital data and for providing the digital data to a transceiver;
  send signal means for providing a send signal to the transceiver for enabling the transceiver to transmit the digital data;
  programmable determination means for programmably and automatically determining when the send signal is to be provided to the transceiver; and
  call detecting means for detecting an incoming call from the transceiver.

* * * * *